March 11, 1941. T. WISE 2,234,327
GLASS GAUGE PROTECTOR
Filed May 29, 1939
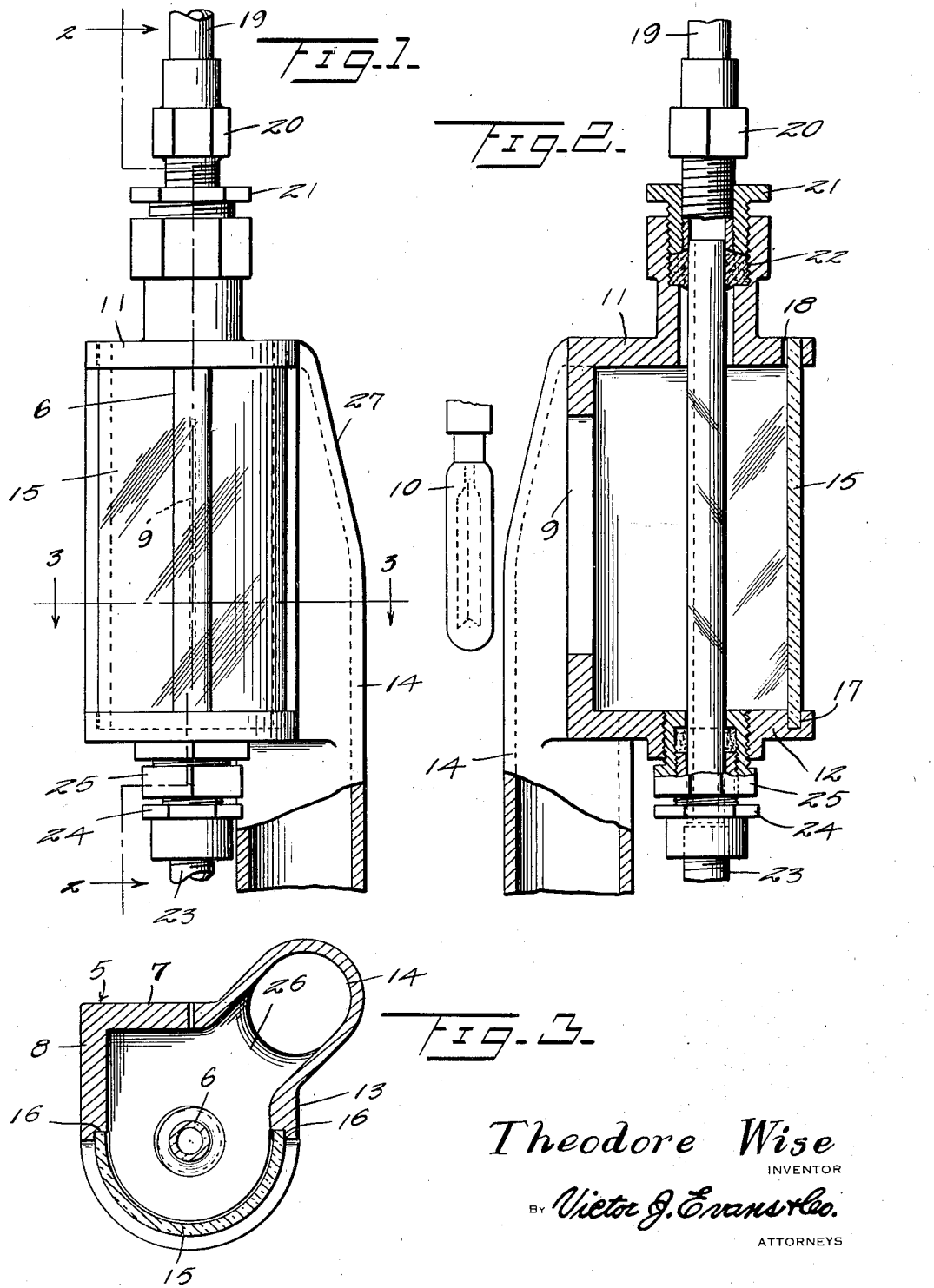
Theodore Wise
INVENTOR
BY Victor J. Evans & Co.
ATTORNEYS Patented Mar. 11, 1941

2,234,327

UNITED STATES PATENT OFFICE 2,234,327

GLASS GAUGE PROTECTOR

Theodore Wise, Pittsburgh, Pa.

Application May 29, 1939, Serial No. 276,449

1 Claim. (Cl. 73—326)

The present invention relates to gauge glass tubes and more particularly to protectors for the same. More particularly the invention relates to the type of water gauge glass tube protector which is adapted primarily for use in connection with a locomotive boiler and functions to safeguard the engineer, and fireman from injury in the event that the gauge glass tube should become broken.

An object of the invention is to provide a water gauge tube protector of the above indicated type in which means is provided for illuminating the interior of the casing so that the glass tube is readily visible at all times.

A further object of the invention resides in the provision of means for supporting a semi-cylindrical shaped shatterproof glass in position about the gauge, glass tube, the means providing a perfect fit to avoid rattling and to prevent steam and hot water from escaping around the edge of the glass.

The invention will be fully and comprehensively understood from a consideration of the following detailed description when read in connection with the accompanying drawing which forms a part of the application.

In the drawing:

Figure 1 is a front elevational view of a water gauge glass tube protector embodying the features of the present invention.

Figure 2 is a vertical sectional view taken substantially on line 2—2 of Figure 1, and Figure 3 is a longitudinal sectional view taken substantially on line 3—3 of Figure 1.

Referring to the drawing for a more detailed description thereof wherein there is disclosed the preferred embodiment of the invention, the numeral 5 generally designates a casing within which is supported the glass gauge tube 6. The shape of the casing 5 is more clearly illustrated in Figure 3 of the drawing wherein it will be noted the same comprises a back wall 7 and side wall 8, the back wall being formed with a vertically disposed slot 9 for admitting light from the illuminating element 10 suspended in back of the casing in order that the tube 6 may be visible at all times.

The casing 5 further comprises top and bottom walls 11 and 12, respectively, and a second side wall 13, which side wall is relatively smaller than the opposed wall 8 due to the attachment of the extensible nozzle 14, to be later described. The front wall of the casing comprises a semi-cylindrical shaped section of shatterproof glass 15, the same being held within the grooves 16 formed in the side walls 8 and 13, the bottom portion of the glass 15 resting within a circumferentially formed groove 17 provided in the bottom wall 12. The upper end of the glass extends through a cut-out portion 18 formed in the top wall 11. Should the glass 15 become broken, it is replaced through the opening 18 without necessitating the removal of the casing or gauge glass tube.

The water gauge tube 6 is supported within the casing and has communication with the boiler, not shown, through a pipe 19, said pipe having connection with a threaded nipple 20 and clamped to the casing through the internally and externally threaded nut 21. The tube 6 is appropriately packed as indicated at 22. A similar connection is provided in the lower end of the casing by means of which the pipe 23 has connection with the tube 6 through the nipple 24 and packing nut 25.

It will be readily apparent from the above description of the illustrated parts of the drawing that the glass gauge tube is effectively sealed within the casing 5. However, should the tube 6 burst under pressure there would be alleviated the possibility of injury from flying glass due to the manner in which said tube is confined. The front wall 15, as afore indicated, is constructed of shatterproof glass thus relieving the possibility of the broken particles of glass, steam or hot water being thrown through that wall. However, should the glass wall 15 become cracked or otherwise damaged due to the impact of the broken tube the same may be readily replaced in the manner indicated.

Means is also provided for permitting the discharge of steam, hot water and fragments of glass from the casing without injury to anyone in the event that breakage of the glass gauge tube occurs, said means comprising a depending nozzle 14 welded or otherwise secured to a portion of the side wall 13 of the casing and extending from the top wall thereof downwardly. The nozzle 14 has communication with the interior of the casing 5 as more clearly shown at 26 in Figure 3 of the drawing, it being understood that the interior of said nozzle is hollow and that the same communicates with the casing from the top to the bottom wall thereof. The upper end of the nozzle 14 is tapered as indicated at 27 for reducing the amount of space required to install the device in the cab of a locomotive or the like. Since the nozzle 14 has communication with the casing 5 throughout the length thereof, when breakage of the glass gauge tube occurs, particles of glass, steam and hot water will be exhausted therefrom being entirely confined while being exhausted. The lower end of the nozzle 14 may terminate at a remote point beneath the cab of the locomotive, so that the steam and broken glass may be conveyed outside of the cab.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claim.

What is claimed is:

A protector device for the tube of a water gauge, comprising in combination, a casing member adapted to surround the tube provided with a slotted opening in the back wall thereof, means for removably attaching said tube within said casing, the front wall of said casing having a semi-cylindrical shaped glass enclosure member removably held in slots formed in the top and bottom walls thereof, and means attached to one side wall of said casing having communication with the interior thereof for exhausting steam and the like from within said casing, said means comprising a tube affixed to the top and bottom walls of said casing and depending downwardly therefrom, said tube being hollow and having communication with the entire length of said casing.

THEODORE WISE.